United States Patent
Rebordosa et al.

(10) Patent No.: US 6,293,691 B1
(45) Date of Patent: Sep. 25, 2001

(54) PROCESSING DEVICE FOR STIRRING OR REDUCING FOODS, PARTICULARLY A HANDHELD BLENDER

(75) Inventors: Antonio Rebordosa, Sant Fruitós de Bages; Mariano Penaranda, Barcelona; Alejandro Hernandez, Santa Oliva; Francesc Carreras, Sant Just Desvern, all of (ES)

(73) Assignee: Braun GmbH, Kronberg (DE)

( * ) Notice: Subject to any disclaimer, the term of this patent is extended or adjusted under 35 U.S.C. 154(b) by 0 days.

(21) Appl. No.: 09/565,701

(22) Filed: May 4, 2000

Related U.S. Application Data

(63) Continuation of application No. PCT/EP98/07054, filed on Nov. 5, 1998.

(30) Foreign Application Priority Data

Nov. 17, 1997 (DE) .............................. 197 50 813

(51) Int. Cl.[7] .............................. A47J 43/044; A47J 43/07
(52) U.S. Cl. .............................................................. 366/129
(58) Field of Search .................................. 366/129, 130, 366/347, 349, 197, 199, 207, 342, 343; 241/168, 169.1, 169, 285.3, 285.2; 99/348; 416/244 R, 63

(56) References Cited

U.S. PATENT DOCUMENTS

| | | | |
|---|---|---|---|
| 1,233,823 | * | 7/1917 | Tiger et al. . |
| 1,412,401 | * | 4/1922 | Gotfredsen . |
| 2,193,356 | * | 3/1940 | Green . |
| 3,117,769 | * | 1/1964 | Spingler . |
| 3,299,924 | * | 1/1967 | Hanschitz . |
| 3,333,830 | * | 8/1967 | Spingler et al. . |
| 4,008,883 | * | 2/1977 | Zubieta . |
| 4,405,998 | * | 9/1983 | Brison . |
| 4,850,699 | * | 7/1989 | Rebordosa . |
| 5,316,382 | * | 5/1994 | Penaranda et al. . |
| 5,366,286 | * | 11/1994 | Ruttimann . |
| 5,368,384 | * | 11/1994 | Duncan et al. . |
| 5,567,047 | * | 10/1996 | Fritsch . |
| 5,810,472 | * | 9/1998 | Penaranda et al. . |
| 5,836,684 | * | 11/1998 | Safont et al. . |
| 5,863,118 | * | 1/1999 | Ackels et al. . |

FOREIGN PATENT DOCUMENTS

| | | |
|---|---|---|
| 1825599 | 1/1961 | (DE) . |
| 1224007 | 9/1966 | (DE) . |
| 114901 | 9/1975 | (DE) . |
| G8632850.6 | 4/1987 | (DE) . |
| 4436092 C1 | 11/1995 | (DE) . |
| 19504638 A1 | 8/1996 | (DE) . |
| 0078050 | 10/1982 | (EP) . |
| 0682904 | 9/1994 | (EP) . |
| 0724857 | 9/1995 | (EP) . |
| WO 96/10944 | 4/1996 | (WO) . |

\* cited by examiner

Primary Examiner—Tony G. Soohoo
(74) Attorney, Agent, or Firm—Fish & Richardson P.C.

(57) ABSTRACT

The invention is directed to a processing device for stirring or reducing foods, particularly a handheld blender, with a motor driven tool shaft extending in a housing part of the housing of the processing device and having a work performing element secured to the shaft's output end. The housing part becomes a protective shield in the area of the output end of the tool shaft, said shield encompassing the work performing element in a radial direction at least in part and terminating in an opening edge at its lower open end. To ensure that the processing tool is not only adequately protected in an initial position by the shield but also well suited to reduce large pieces of solid foods, means are provided for enabling a relative axial displacement of the work performing element and the opening edge of the shield.

6 Claims, 2 Drawing Sheets

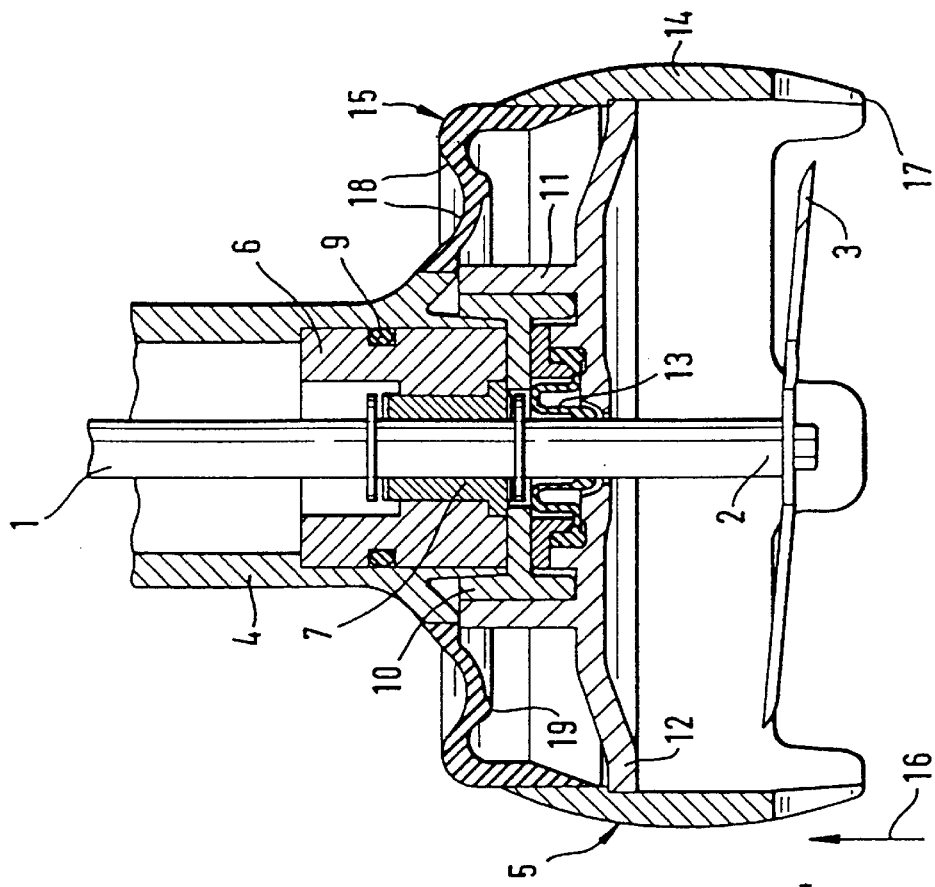
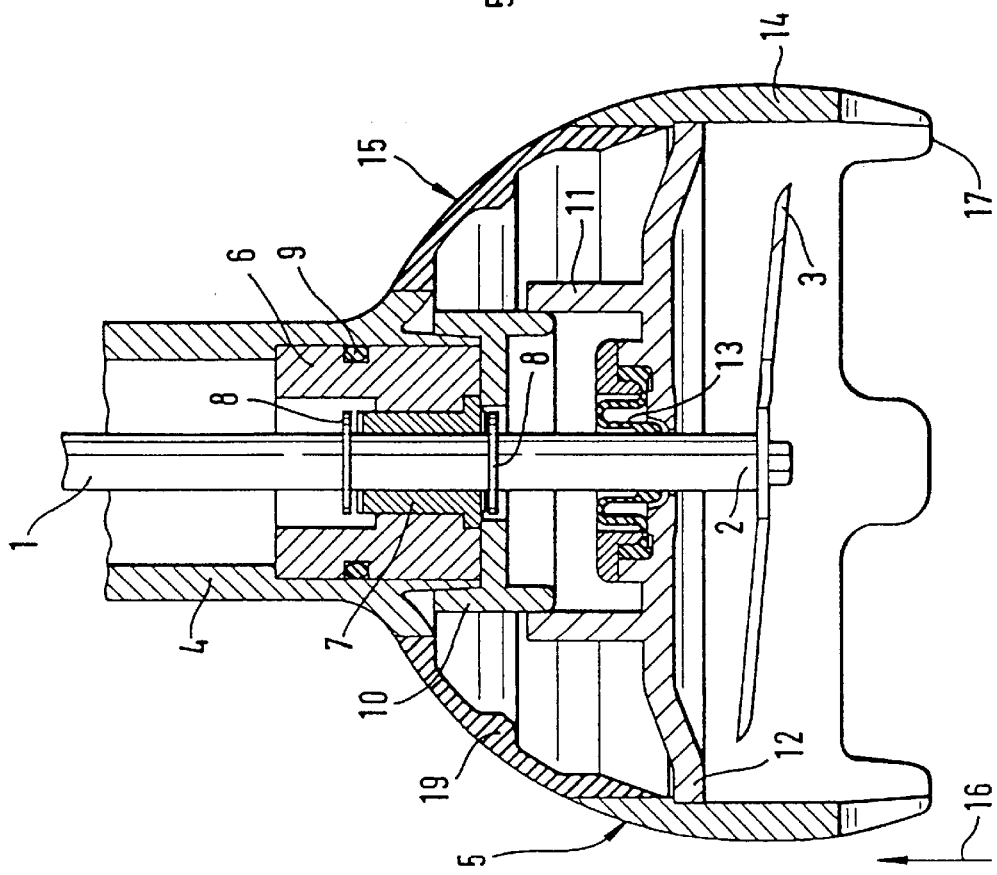

PROCESSING DEVICE FOR STIRRING OR REDUCING FOODS, PARTICULARLY A HANDHELD BLENDER

This is a continuation of PCT application Ser. No. PCT/EP98/07054, filed Nov. 5, 1998, which claims priority from German application Ser. No. 19750813.8, filed Nov. 17, 1997, (pending).

BACKGROUND

This invention relates to a processing device for stirring or reducing foods, particularly a handheld blender, according to the prior-art portion of claim 1.

Processing devices are known from WO 96/10944 (PCT/EP95/03932) or EP-A1 0 724 857, for example. Such processing devices or handheld blenders are used in great diversity, particularly during the daily preparation of foods, in order to reduce and blend food materials, for example. Such handheld blenders typically have a motor housing adjoining an elongated housing part whose end becomes a shield open at its bottom end and also referred to as the housing bell. Inside the motor housing is a drive motor which drives a tool shaft extending through the elongated housing part and usually having a cutter blade fitted to its end in the area of the shield. The shield is designed big enough to completely encompass the cutter blade and to project a defined distance beyond the end of the shaft or cutter blade as seen looking in the direction of the tool shaft's axis. One of the functions performed by the shield is to protect the user of the device from the rotating cutter blade. Another is to act as a splash guard, particularly when processing low-viscosity foods.

Such processing devices or handheld blenders can be adapted to different requirements by selection of the speed at which the shaft and hence the cutter blade rotates. Problems may arise when wishing to reduce solid foods such as carrots. In this case the carrots must first be cut into short enough pieces to be able to enter the inside of the bell in order to reach the bite of the cutter blade when the handheld blender or its housing bell is immersed in the pre-cut carrots. If these carrot pieces are too big or the container holding the carrots is too small to allow relative movement of the carrot pieces at all or only with difficulty, it can happen that the edge of the shield comes to rest on such large pieces, preventing it from advancing any further. Consequently, the cutter blade fails to reach the carrot pieces in order to reduce them. This problem can usually be remedied by raising the handheld blender and immersing it again into the food pieces to be reduced until it engages the pieces.

From DE-B-12 24 007 there is known a processing device having a processing tool designed to be pushed in and out of the bell compartment accommodating the processing tool in order to be better able to clean the bell compartment and the processing tool.

Similarly, from EP 0 078 050 there is known a processing device such as a handheld blender on which the processing tool can be moved out of the bell against the force of a spring only when the bell is immersed in liquid foods. Moving the processing tool out of the bell should enable the foods to be homogeneously and completely mixed and reduced at high speed. As soon as the bell is removed from the foods, the processing tool retracts into the interior of the bell compartment with an axial sliding movement caused by the spring force. Injuries are thus prevented because the processing tool is now protected by the bell.

From DE-A-19504638 and U.S. Pat. No. 3,299,924, processing devices of the type initially referred to are known providing for relative displacement of the bell edge and the work performing element. The embodiments of the adjusting devices are mechanically complex and therefore expensive.

It is an object of the present invention to improve upon a processing device, particularly a handheld blender, in such a way that the processing tool, in particular a cutter blade, is not only sufficiently protected in an initial position by the shield but also well suited to better reduce large pieces of solid foods.

SUMMARY OF THE INVENTION

This object is accomplished with a processing device for stirring or reducing foods, particularly a handheld blender, with a motor driven tool shaft extending in a housing part of the housing of the processing device and having a work performing element secured to the shaft's output end, the housing part becoming a protective shield in the area of the output end of the tool shaft, the shield encompassing the work performing element in a radial direction at least in part and terminating in an opening edge at its lower open end, an elastic intermediate member arranged between the shield and the housing part being provided for enabling a relative axial displacement of the work performing element and the opening edge of the protective shield so that in use of the processing device different food materials can be better processed. The elastic intermediate member undergoes an elastic deformation as the housing part is displaced from the lower position to the upper position and vice versa. An essential point is that the opening edge can be moved in axial direction in its relative position to the work performing element, which can be effected by applying manual pressure to the processing device. The shield is held in an initial position so that it cover the work performing element adequately, acting as a guard in relation to the work performing element. If low-viscosity foods are processed, the shield remains in this extended position in every phase of the device's use and acts as a splash guard. If the device is to be used, however, for reducing pieces of solid foods such as carrots, potatoes, apples or onion, the device is immersed in the container holding the pieces of food and settles with the bottom edge of the shield on the pieces of food to be reduced. If, in one embodiment, the resistance to advancing the shield into the pieces of food then increases, the result will be a relative axial displacement of the work performing element and the opening edge of the shield so that the work performing element is moved further toward the opening edge and may project slightly beyond the opening edge. The work performing element thus penetrates such pieces of food on which the opening edge of the shield rests and which otherwise would prevent any further advancing of the shield with the work performing element retracted therein. Not only is it therefore materially easier to reduce pieces of solid foods, the processing device is also guaranteed to be safer to operate because it engages in the pieces of food, practically without resistance, on account of the relative axial displacement of the work performing element and the opening edge of the shield.

With the processing device constructed in this way it is also possible to reduce foods of a size corresponding to or exceeding the diameter of the shield, which with a fixed shield would not be possible. When the large pieces of food are progressively reduced in size by the processing device, during which process the shield is displaced in conformity with the resistance arising when penetrating the food, this displacement no longer occurs as the reduction of the food progresses, and the shield adopts its function as a splash guard and protection from the work performing element.

The means for the axial displacement are made of an elastic intermediate member. This intermediate member is arranged between the shield and the housing part. If the shield encounters resistance when engaging in the food to be reduced, the intermediate member will deform elastically, enabling the housing part to slide from a lower position to an upper position and vice versa. In this arrangement the edge of the bell remains adhered to the bottom of the processing container. When deformation of the bell takes place, the space enclosed by the bell becomes smaller, so that foods of relatively firm consistency are literally squashed and forced out through the slits in the side of the bell. This considerably improves the reducing operation. At the same time the bell does not need to be continually lifted off the bottom, which is made more difficult by the effect of suction which occurs when the cutter blade is in action. Spattering of food due to the sudden lifting and partial removal of the bell from the food is likewise prevented. While the free end of the bell can remain in constant contact with the bottom, the food is forced by pressing movements via the bell-carrying shank out of the compartment through the slits in the side of the bell and new food drawn in again when the pressure is relieved. This takes place in addition to the food's mixing movements produced by the processing tool.

In cases where an elastic intermediate member is involved, it is desirable for said elastic intermediate member to undergo deformation in such a way as to produce a flute or fold as seen looking in a radial direction to the axis of the tool shaft in order to enable a defined deformation of the elastic intermediate member on the one hand and to help prevent material fatigue on the other hand. The formation of such a flute or fold can be promoted by constructing the elastic intermediate member in radial direction to the axis of the tool shaft with different thicknesses of material, thus creating zones of compulsory deformation, or by already constructing the elastic intermediate member with a flute or fold in a radial direction to the shaft axis that becomes more pronounced as the housing g part is displace. The intermediate member is preferably biased to an amount sufficient for the shield to be returned to its advanced initial position when the forces acting on the edge of the shield decrease.

As an alternative to an axial displacement of the entire shield as described above, it is possible to provide a shield designed to be radially expandable. Radial expansion of the shield changes the axial position of the shield edge so that the axial distance between the work performing element and the opening edge decreases as the shield is expanded. Such an expansion always occurs when pressure is exerted on the opening edge. To achieve such an expansion of the shield, the shield can be made of individual, overlapping segments, for example. These segments are then pivotally mounted in their angle relative to the axis of the tool shaft so tat, when pressure is exerted on the opening edge, they are able to pivot in such a way that the shield becomes larger or smaller in the area of the opening edge.

With a view to being able to enlarge the shield in a radial direction it is also possible to make the shield from an elastic material.

BRIEF DESCRIPTION OF THE DRAWINGS

Further details and features of this processing device of the present invention will become apparent from the subsequent description of embodiments of a handheld blender in conjunction with the accompanying drawing. In the drawing, FIG. 1 is a longitudinal sectional view of the end of a handheld blender, illustrating the shield, that is, the housing bell, in a lower position;

FIG. 2 is a view of the arrangement of FIG. 1 illustrating the shield in an upper position.

DETAILED DESCRIPTION

Figure 3:
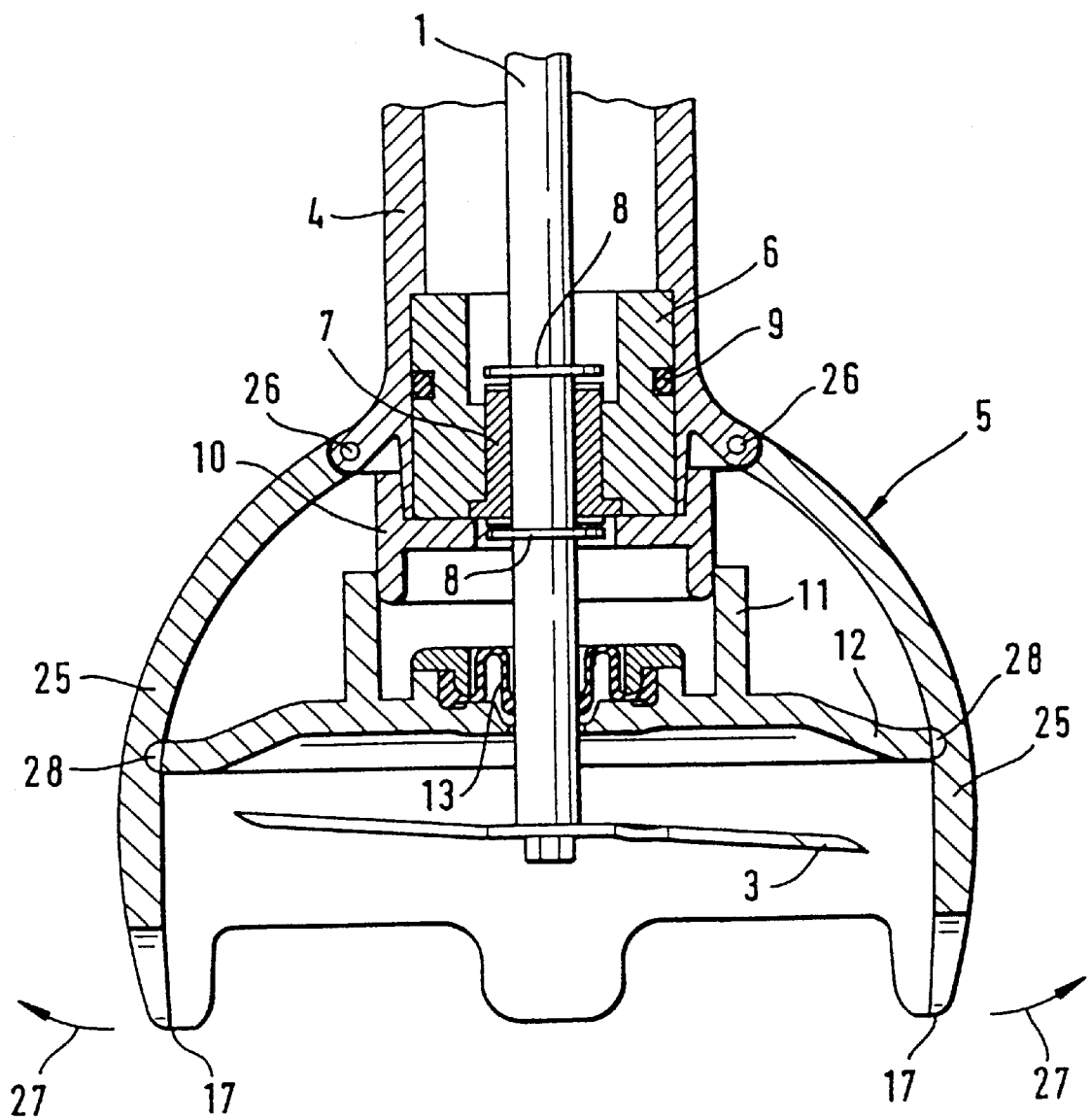
FIG. 3 is a schematic view of a shield arrangement composed of pivotal segments.

FIGS. 1 and 2 show in longitudinal section a processing device with a tool shaft 1 carrying a processing tool 3 in the form of a cutter blade at its lower, output end 2. At its input end the tool shaft 1 is centrally guided in a shaft housing 4. At its lower end the shaft housing 4 becomes a shield or housing bell 5. At its open end this shield expands so that it radially encompasses the processing tool 3 in spaced relationship thereto and projects a defined distance beyond the output end 2 of the tool shaft 1 and hence beyond the processing tool 3 as seen looking in the direction of the axis of the tool shaft 1.

In the transition zone between the shaft housing 4 and the shield 5 a bearing member 6 with a bearing sleeve 7 supporting the tool shaft 1 is inserted in the shaft housing 4. Above and underneath the bearing sleeve 7 are clamping rings 8 which secure the tool shaft 1 against axial displacement in the bearing sleeve 7 and hence in the bearing member 6 and the shaft housing 4. The bearing member 6 is sealed from the shaft housing 4 by a sealing ring 9. Furthermore, a first sleeve-shaped member 10 is mounted on the end of the shaft housing 4 which slightly projects into the interior of the shield 5. A second sleeve-shaped member 11 is associated with the first sleeve-shaped member 10, engaging the first sleeve-shaped member 10 on the outside.

Secured to the end of the second sleeve-shaped member 11 facing the processing tool 3 is a cover plate 12 extending at approximately right angles to the axis of the shaft 1 as far as the inner wall of the shield 5. This cover plate 12 covers that area of the shield 5 and the shaft housing 4 in which the tool shaft 1 is mounted and the sleeve-shaped members 10 and 11 are arranged. The tool shaft 1 is sealed furthermore from the cover plate 12 by a shaft sealing ring 13.

Between the shaft housing 4 and the lower section of the shield 5, which is made of a rigid material, the shield 5 is formed by an intermediate member 15. As becomes apparent from FIGS. 1 and 2, this intermediate member 15 adjoins the lower section 14 of the shield 5 directly above the cover plate 12. The intermediate member 15 is made of an elastic material such as rubber or plastic so that the shield 5 in the area of this intermediate member is of a flexible and hence yielding configuration. Furthermore, the intermediate member 15 is equipped with a circumferential bead 19 extending radially to the tool shaft 1 and projecting from the inside of the intermediate member 15 beyond its basic wall thickness.

As a result of the interfitting engagement of the two sleeve-shaped members 10 and 11, the cover plate 12 together with the lower section 14 of the shield 5 is displaceable from a lower position, as shown in FIG. 1, in the direction of the arrow 16 in axial direction of the tool shaft 1 when a force is exerted on the opening edge 17 of the shield 5 or the lower section 14. Such a force is produced during use of the processing device when the shield 5 rests with its opening edge 17 on solid, non-reduced food. As the force exerted on this opening edge 17 increases, the lower section 14 of the shield 5 is displaced from the initial position shown in FIG. 1 until an upper position of the lower section 14 is reached, as shown in FIG. 2. With the lower section 14 in this displaced position, the processing tool 3 lies closer to the opening edge 17. During the transition from the position of the lower section 14 according to FIG. 1 to the position shown in FIG. 2 the intermediate member 15 undergoes deformation as shown in FIG. 2. As this occurs, defined flutes or folds 18 are formed, such formation being promoted by the annular bead 19 or by differences in the wall thicknesses of the intermediate member 15. In the deformed state of the intermediate member 15 as shown in FIG. 2, the intermediate member 15 is biased to such an extent that it urges the lower section 14 of the shield 5 back to its initial position as shown in FIG. 1 when the pressure on the opening edge 17 decreases.

As becomes apparent from the above described first embodiment of the processing device as shown in FIG. 1 and FIG. 2, the processing device adapts in its position inside the shield 5 to the respective working conditions as a result of the flexible member 15.

If low-viscosity materials are to be processed with the device, the device is immersed in the liquid in the position shown in FIG. 1. In this position the work performing element 3 is inwardly retracted far enough away from the opening edge 17 of the shield so that the shield 5 acts as a splash guard.

If the processing device is to be used to reduce non-comminuted foods or foods that are only pre-cut into large pieces, then the processing device is immersed in the food to be processed with the shield 5 positioned as shown in FIG. 1. If the shield comes with its opening edge 17 up against pieces of food which prevent the shield from advancing any further into the said pieces, then the shield 5 or its lower section 14 is displaced upwards in the direction of the arrow 16 by the intermediate member 15 undergoing deformation in accordance with FIG. 2 so that the work performing element or cutter blade 3 lies closer to the opening edge 17. In this position according to FIG. 2, or in a yet higher displaced position of the shield 5, those pieces of food on which the opening edge 17 rests are directly engaged by the processing tool 3. By reducing such pieces of food it is then possible to advance the shield further into the food in order to reduce it. With disintegration of the food progressing and, hence, the resistance encountered by the opening edge 17 of the shield 5 as it advances into the food diminishing, the shield 5 returns to its initial position according to FIG. 1. Safe operation of the device is thus assured when very different foods are to be reduced with the device.

A second embodiment of a processing device is illustrated in FIG. 3 which will be described in the following. Parts of the processing device of the type shown in FIG. 3 correspond in their design and function with those of the first embodiment of FIGS. 1 and 2 and are designated with the same reference numerals so that their descriptions will not be repeated in the following.

In the second embodiment as shown in the sectional view of FIG. 3, the shield 5 is divided in circumferential direction into individual segments 25 which overlap each other in circumferential direction when in the position shown in FIG. 3. In the area of transition from the shield 5 to the shaft housing 4 the individual segments 25 are each pivotally mounted by a respective joint 26 enabling said individual segments 25 to pivot outwardly in the direction of the pivot arrows 27. To enable the segments 25 to pivot in this way in the direction of the arrows 27 the cover plate 12 is also equipped with spigots 28, indicated in FIG. 3, which are guided in registering grooves, not shown in greater detail, extending in the direction of the axis of the tool shaft 1 on the inside of the segments 25. The cover plate 12 is itself centrally and slidably mounted by an arrangement comprising a first sleeve-shaped member 10 and a second sleeve-shaped member 11, comparable to the arrangement of FIGS. 1 and 2.

If pressure is exerted on the opening edge 17, the segments 25 attempt to yield to this pressure by pivoting outwards around the joints 26 in the direction of the pivot arrows 27 so that the processing tool 3 again moves closer to the opening edge 17. Spring elements can be provided, for example, between the two sleeve-shaped members 10 and 11 for when the pressure exerted on the opening edge 17 decreases in order to return the segments 25 of the shield to their initial position as shown in FIG. 3.

While the first and the second embodiment of FIGS. 1, 2 and 3 show only the forward end of the processing tool 3 with the shield 5 and a part of the shaft housing 4, it will be understood, of course, that the shaft housing 4 can be extended in an upward direction to become a corresponding motor housing; alternatively, the arrangements according to FIGS. 1, 2 and 3 can also be used as attachments for fitting to a corresponding drive unit.

What is claimed is:

1. A processing device for stirring or reducing foods, the processing device comprising:
   a motor driven tool shaft having an output end;
   a work performing element secured to the output end of the tool shaft; and
   a housing terminating in an opening edge circumscribing a lower open end, the housing including a housing part within which the shaft extends, a protective shield displaceable between a lower position and an upper position, the protective shield disposed in an area of the output end of the tool shaft, said protective shield encompassing the work performing element in a radial direction at least in part, and an elastic intermediate member arranged above the opening edge and capable of undergoing an elastic deformation as the protective shield is displaced between the lower position and the upper position,
   wherein the elastic intermediate membrane enables a relative axial displacement of the work performing element and the opening edge of the protective shield so that in use of the processing device, different food materials can be better processed.

2. The processing device of claim 1, wherein the elastic intermediate member is arranged between the housing part and the protective shield.

3. The processing device of claim 2, wherein the elastic intermediate member deforms under the formation of at least one of a flute and a fold.

4. A processing device for stirring or reducing foods, the processing device comprising:
   a motor driven tool shaft having an output end;
   a work performing element secured to the output end of the tool shaft;
   a housing having an opening edge at a lower open end, the housing including a housing part within which the shaft extends and a radially expandable protective shield displaceable between a lower position and an upper position, the protective shield disposed in an area of the output end of the tool shaft and at least partially encompassing the work performing element in a radial direction,
   wherein the radially expandable protective shield enables a relative axial displacement of the work performing element and the opening edge of the protective shield so that in use of the processing device different food materials can be better processed.

5. The processing device of claim 4, wherein said radially expandable protective shield comprises a plurality of segments, said segments being pivotable relative to the axis of the tool shaft for increasing and decreasing an opening width of the protective shield in an area of the opening edge.

6. The processing device of claim 4, wherein the radially expandable protective shield is of an elastic material.

* * * * *